(12) United States Patent
Mintova et al.

(10) Patent No.: US 10,919,028 B2
(45) Date of Patent: Feb. 16, 2021

(54) METHOD FOR THE PREPARATION OF A SYNTHETIC FAUJASITE MATERIAL COMPRISING MONODISPERSE NANOPARTICLES COMPOSED OF SINGLE NANOCRYSTALS

(71) Applicant: CENTRE NATIONAL DE LA RECHERCHE SCIENTIFIQUE, Paris (FR)

(72) Inventors: Svetlana Mintova, Basly (FR); Hussein Awala, Caen (FR); Jean-Pierre Gilson, Cairon (FR); Valentin Valtchev, Basly (FR)

(73) Assignee: CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 484 days.

(21) Appl. No.: 15/109,059

(22) PCT Filed: Dec. 30, 2013

(86) PCT No.: PCT/IB2013/003060
§ 371 (c)(1),
(2) Date: Jun. 29, 2016

(87) PCT Pub. No.: WO2015/101800
PCT Pub. Date: Jul. 9, 2015

(65) Prior Publication Data
US 2016/0325271 A1   Nov. 10, 2016

(51) Int. Cl.
| | | |
|---|---|---|
| *B01J 29/08* | (2006.01) | |
| *C01B 39/20* | (2006.01) | |
| *B01J 31/02* | (2006.01) | |
| *B01J 31/26* | (2006.01) | |
| *B01J 35/00* | (2006.01) | |
| *C01B 39/24* | (2006.01) | |

(52) U.S. Cl.
CPC ......... *B01J 29/084* (2013.01); *B01J 31/0202* (2013.01); *B01J 31/0208* (2013.01); *B01J 31/26* (2013.01); *B01J 35/0013* (2013.01); *C01B 39/20* (2013.01); *C01B 39/205* (2013.01); *C01B 39/24* (2013.01); *B01J 2231/40* (2013.01); *B01J 2531/002* (2013.01); *C01P 2004/62* (2013.01); *C01P 2004/64* (2013.01); *C01P 2006/12* (2013.01); *C01P 2006/14* (2013.01)

(58) Field of Classification Search
None
See application file for complete search history.

(56) References Cited

U.S. PATENT DOCUMENTS

| | | | | |
|---|---|---|---|---|
| 4,166,099 A | * | 8/1979 | McDaniel | ............... C01B 39/20 423/709 |
| 6,284,218 B1 | * | 9/2001 | Kuvettu | ................ C01B 39/20 423/709 |
| 2004/0047803 A1 | | 3/2004 | Valtchev et al. | |
| 2010/0028231 A1 | | 2/2010 | Larsen et al. | |
| 2010/0304140 A1 | | 12/2010 | Bouvier et al. | |
| 2012/0279901 A1 | * | 11/2012 | Domokos | ............... B01J 23/888 208/109 |
| 2014/0135559 A1 | * | 5/2014 | Sawamura | ................ C07C 7/13 585/820 |

OTHER PUBLICATIONS

Chaves, Thiago, et al. "A simple synthesis procedure to prepare nanosized FAU crystals". Microporous and Mesoporous Materials. (2012). (Year: 2012).*
Valtchev, Valentin, et al. "Gel evolution in a FAU-type zeolite yielding system at 90 degrees C". Microporous and Mesoporous Materials. (2007). (Year: 2007).*
Huang, Yi, et al. "Synthesis of Hierarchical porous zeolite NaY particles with controllable particle sizes" Microporous and Mesoporous Materials (2010). (Year: 2010).*
Search Report dated 2014.
Chaves et al: "A simple synthesis procedure to prepare nanosized faujasite crystals" Dated: May 16, 2012.
Valtchev et al: "Transmission electron microscopy study of the formation of FAU-type zeolite at room temperature" Dated: Nov. 9, 2004.
Valtchev et al: "Gel evolution in a FAU-type zeolite yielding system at 90<o>C" Dated: Mar. 29, 2007.
Coutinho et al: "Preparation and characterization of zeolite X membranes via pulsed-laser deposition" Dated: Jan. 24, 2002.
Huang et al: "Synthesis of hierarchical porous zeolite NaY particles with controllable particle sizes" Dated: Aug. 8, 2009.

* cited by examiner

*Primary Examiner* — Sheng H Davis
(74) *Attorney, Agent, or Firm* — IPSILON USA, LLP (57) ABSTRACT

The present invention relates to a method for the preparation of faujasite nanocrystals, to faujasite nanocrystals, to a method for the preparation of a stable colloidal suspension of faujasite nanocrystals, to a stable colloidal suspension of faujasite nanocrystals, and to the use of said faujasite nanocrystals and said stable colloidal suspension of faujasite nanocrystals in various applications.

10 Claims, 7 Drawing Sheets

METHOD FOR THE PREPARATION OF A SYNTHETIC FAUJASITE MATERIAL COMPRISING MONODISPERSE NANOPARTICLES COMPOSED OF SINGLE NANOCRYSTALS

BACKGROUND

Related Applications

This application is a National Phase Application of PCT/1132013/003060 filed on Dec. 30, 2013, the entirety of which is incorporated herein by reference.

Field of the Invention

The present invention relates to a method for the preparation of faujasite (FAU-type zeolite) nanocrystals, to faujasite nanocrystals, to a method for the preparation of a stable colloidal suspension of faujasite nanocrystals, to a stable colloidal suspension of faujasite nanocrystals, and to the use of said faujasite nanocrystals and said stable colloidal suspension of faujasite nanocrystals in various applications.

Zeolites are hydrated metal aluminum silicates basically comprising a three-dimensional framework of $SiO_4$ and $AlO_4$ tetrahedra. The electroneutrality of each tetrahedra containing aluminum is balanced by the inclusion in the crystal of a cation, for example a sodium ion. The micropore spaces (channels and cavities) are occupied by water molecules prior to dehydration. Zeolites are characterized by their high specific surface areas, high micropore volume, and capacity to undergo cation exchange. Zeolites as microporous inorganic materials have different applications, such as catalysts (e.g. use in heterogeneous catalysis), absorbents, ion-exchangers, and membranes, in many chemical and petrochemical processes (e.g. in oil refining and petrochemistry) due to their superior properties including mechanical strength, acidity, size or shape selectivity, thermal and chemical stability, and large ion-exchange capacity. Currently, 213 different types of zeolites exist and they have different chemical composition, pore sizes and thus different properties. While the chemical composition and pore architecture of zeolites are important, a precise control of the size and shape of their particles can dramatically influence their properties for example, in catalysis and adsorption. As with other materials, a decrease in the size of their constitutive crystals leads to substantial changes in their properties. For example, in catalysis and adsorption, one of the drawbacks of zeolites is the occurrence of severe mass transfer limitations impeding the full use of their potential. Among the synthetic zeolites with higher commercial interest, high quality nanocrystals of zeolites X and Y (which are FAU-type zeolites), are expected to dramatically lower the mass transfer resistances in these processes. Depending on the Si/Al ratio, FAU-type zeolites can be subdivided into FAU-X zeolite (Si/Al=1-1.5) and FAU-Y zeolite (Si/Al>1.5). FAU-type zeolites possess a three-dimensional pore structure with an aperture of 0.74 nm. Their basic structural units, the sodalite cage, assemble in a diamond structure to form a spherical supercage developing a diameter of 1.3 nm.

DESCRIPTION OF RELATED ART

Li et al. [*Chem. Mater.*, 2002, 14, 1319-1324] described a method for preparing nanocrystalline FAU-Y zeolites comprising the following steps: (1) preparing two solutions A and B, a solution A comprising sodium hydroxide, an organic templating agent such as tetramethylammonium hydroxide (TMAOH) (also called an organic structure-directing agent), water and a source of alumina (e.g. aluminum isopropylate), and a solution B comprising a source of silica (e.g. tetraethylorthosilicate), water and TMAOH, (2) mixing solution A with solution B, (3) agitating the resultant mixture, (4) sealing the resultant mixture in polytetrafluoroethylene (PTFE)-lined stainless steel autoclaves, and maintaining said mixture at a fixed temperature of 100 or 130° C. without agitation.

However, the commonly used organic-template approaches suffer from several drawbacks. Firstly, organic templates are not environmentally friendly (e.g. water and air pollution arising from their thermal decomposition), non-recyclable and expensive. Secondly, the removal of the organic-templating agent from nanosized zeolites requires an additional step of calcination, which leads to an irreversible aggregation of the nanocrystals into larger solid particles, thus diminishing their expected advantages. Thirdly, very small crystalline yields are obtained (i.e. yield of about 10%). Fourthly, partial distortion (collapse) of the crystalline structure of nanosized zeolites under calcination is observed. Finally, the FAU-type zeolite nanocrystals synthesized from organic-template approaches exhibit microporosity and/or specific surface area lower than conventional micron-sized zeolites (micropore volume of about 0.12 $cm^3 \cdot g^{-1}$ and BET surface area of about 448 $m^2 \cdot g$).

Other syntheses of nanosized zeolites, such as the one described in EP-A1-0753483, employ zeolite seed nanocrystals. It is well known that seeding has beneficial effects, for example, in controlling the particle size of the product, avoiding the need for an organic template, accelerating the synthesis, and improving the proportion of product of the intended structure type. However, the main drawback of these syntheses is the preliminary and distinct preparation of seeds, thus leading to an expensive and long process. Moreover, no all types of zeolites can be synthesized with seeding approach with controlled particle size and morphology.

Valtchev et al. [*J. Phys. Chem. B*, 2004, 108, 15587-15598] describe a room-temperature method for the preparation of FAU-type zeolite nanocrystals comprising the following steps: separately preparing an aqueous silicate solution and an aqueous aluminate solution, admixing said aqueous solutions to form an organic-free gel system, and aging the gel at room temperature for several days. However, this method leads to FAU-type zeolite nanocrystals after a slow crystallization of almost 3 weeks, and yields 100-300 nm crystal aggregates built of 10-20 nm nanocrystals. Because of aggregation, the obtained FAU-type zeolite nanocrystals cannot be uniformly dispersed in water or other solvents and therefore, don't display colloidal properties. Thus, their use in catalytic reactions, separations by adsorption and coating applications are not facilitated.

Objects and Summary

Consequently, an alternative method of synthesis that provides high quality nanosized zeolites X and Y without the above disadvantages is highly desirable, in particular for applications such as adsorption and heterogeneous phase catalysis.

More particularly, the aim of the present invention is to provide a preparation method which leads from commonly used initial reagents, to synthetic faujasite nanocrystals having tunable silicon to aluminum molar ratios, a narrow particle size distribution, a very high crystalline yield of nanosized particles, a high specific surface area, a high pore volume, and excellent colloidal and thermal stabilities.

A first object of the present invention is a method for the preparation of a synthetic faujasite material comprising monodisperse nanoparticles composed of single nanocrystals, said nanoparticles having a size going from 5 to 400 nm, preferably from 5 to 200 nm, and a silicon to aluminum molar ratio Si/Al going from 1 to 2.5, wherein said method comprises the following steps:

1) separately preparing a clear aqueous aluminate suspension A comprising at least one source of aluminum and at least one source of an alkali metal M1, and a clear aqueous silicate suspension B comprising at least one source of silicon and at least one source of an alkali metal M1;

2) admixing the clear aqueous aluminate suspension A and the clear aqueous silicate suspension B until a resulting aqueous suspension is obtained, said resulting aqueous suspension being free of organic-templating agents and having the following molar composition:

$$x_1 M1_2O : y Al_2O_3 : 10 SiO_2 : z H_2O \quad (I)$$

in which:
0.1≤y≤5, and preferably 0.5≤y≤1.5,
20≤z≤400, and preferably 20≤z≤320,
5≤x₁≤13;

3) aging the resulting suspension of step 2) at a temperature going from about 20° C. to about 30° C. to form nuclei;

4) heating the resulting suspension of step 3) at a temperature going from about 40° C. to about 150° C., for a period of time sufficient to produce the desired synthetic faujasite material comprising monodisperse nanoparticles composed of single nanocrystals; and 5) recovering said synthetic faujasite material comprising monodisperse nanoparticles composed of single nanocrystals.

Within the meaning of the present invention, the term "clear aqueous suspension" is understood to mean an aqueous suspension having approximately the same refractive index as water, that is to say a refractive index of about 1.333±0.030.

Within the meaning of the present invention, the term "turbid aqueous suspension" is understood to mean an aqueous suspension having a different refractive index from water, that is to say a refractive index different from about 1.333±0.030.

Within the meaning of the present invention, the term "monodisperse nanoparticles" is understood to mean nanoparticles (i.e. single nanocrystals) having approximately the same size and shape.

Within the meaning of the present invention, the term "FAU-X zeolite" is understood to mean a synthetic faujasite material composed of nanoparticles having a Si/Al molar ratio going from 1.0 to 1.5.

Within the meaning of the present invention, the term "FAU-Y zeolite" is understood to mean a synthetic faujasite material composed of nanoparticles having a Si/Al molar ratio going from 1.51 to 2.5.

Within the meaning of the present invention, the term "single nanocrystals" is understood to mean individual nanocrystals or non-agglomerated nanocrystals. This also means that the synthetic faujasite material prepared according to the method of the invention comprises at most 5% by weight of aggregates of nanocrystals and/or polycrystalline agglomerates, preferably at most 1% by weight of nanocrystals and/or polycrystalline agglomerates, and more preferably it is free from aggregates of nanocrystals and/or free from polycrystalline agglomerates.

The process of the present invention allows the precise control of the nucleation stage [steps 1) and 2)] and of the crystallization step (step 3). Therefore, it leads to a synthetic faujasite material comprising monodisperse nanoparticles composed of single nanocrystals with a narrow particle size distribution and a very high crystalline yield (i.e. above 50%). In addition, the nanoparticles obtained by the process of the present invention have tunable Si/Al molar ratios and display high specific surface area, a mesoporous surface/volume expected from such ultrasmall-sized uniform nanocrystals, an excellent thermal stability after ion-exchange (e.g. at 400° C. with no steam added), and a superior catalytic activity for example in the transformation of bulky molecules.

Indeed, the size of the nanoparticles plays a significant role in the catalytic performance since reduction of the particle size increases the ratio of the number of external to internal atoms and therefore, causes the nanoparticles to have large, accessible external surface areas and large high surface activities.

In addition, the process of the present invention compared to conventional ones does not need organic-templating agents as well as space confiners. Confined space synthesis method involves the crystallization of a zeolite inside of a matrix with controlled porosity. Thus, the crystals cannot grow larger than the pores of the used matrix. To date, a variety of space confiners such as carbon blacks, carbon nanotubes, starch, gelling polymers and polymer spheres have been utilized to confine the crystallization of zeolite nanocrystals.

Thus, it does not require a further step of heat treatment such as a calcination step to remove the non-zeolitic part.

Within the meaning of the present invention, the term "calcination" is understood to mean a heat treatment at a temperature going from 400° C. to 700° C., during 1 to 10 hours, under an air, oxygen or inert (N₂) atmosphere.

Moreover, the starting materials used in the synthesis are those commonly used in the commercial production of zeolites.

According to a first variant of the method of the present invention, the monodisperse nanoparticles composed of single nanocrystals have a size going from 5 to 35 nm, a silicon to aluminum molar ratio Si/Al going from 1.51 to 2.5, and the resulting aqueous suspension obtained in step 2) is a clear resulting aqueous suspension having the following molar composition:

$$x_1' M1_2O : y' Al_2O_3 : 10 SiO_2 : z' H_2O \quad (I')$$

in which:
0.6≤y'≤1,
90≤z'≤200,
5≤x₁'≤9.

According to a second variant of the method of the present invention, the monodisperse nanoparticles composed of single nanocrystals have a size going from 36 to 200 nm, a silicon to aluminum molar ratio Si/Al going from 1.51 to 2.5, and the resulting aqueous suspension obtained in step 2) is a turbid resulting aqueous suspension having the following molar composition:

$$x_1'' M1_2O : y'' Al_2O_3 : 10 SiO_2 : z'' H_2O \quad (I'')$$

in which:
0.6≤y''≤1,
200≤z''≤320,
9≤x₁''≤13.

According to a third variant of the method of the present invention, the monodisperse nanoparticles composed of single nanocrystals have a size going from 5 to 70 nm, a silicon to aluminum molar ratio Si/Al going from 1 to 1.50, and the resulting aqueous suspension obtained in step 2) has the following molar composition:

$$x_1'''M1_2O:y'''Al_2O_3:10SiO_2:z'''H_2O \quad (I''')$$

in which:
$1 \leq y''' \leq 1.5$,
$20 \leq z''' \leq 170$,
$5 \leq x_1''' \leq 13$.

Step 1):

The clear aqueous aluminate suspension A of step 1) can be prepared according to the following step:

1-i) mixing a source of aluminum, a source of alkali metal M1 and water.

The water is preferably de-ionized or double distilled water (dd $H_2O$). The distillation involves boiling the water and then condensing the vapor into a clean container to obtain primary condensed water, followed by boiling the primary condensed water and then condensing the new vaporized water into a collecting container.

The source of aluminum can be selected from any source of aluminum that is able to provide during step 1) monomeric oxihydroxide species.

Within the meaning of the present invention, the term "any source of aluminum that is able to provide during step 1) monomeric oxihydroxide, species" is understood to mean that this source of aluminum does not provide polymeric aluminum oxihydroxide species and allows all the aluminum to be dissolved in the clear aqueous suspension A [R. M. Barrer, "Hydrothermal Chemistry of Zeolites", 1982, Academic press, London].

In one embodiment, the preparation of the clear aqueous aluminate suspension A further comprises the following step:

1-ii) heating the mixture obtained in step 1-i).

The heating is preferably performed at a temperature going from 60° C. to 100° C. approximately, during 1 min to 10 min approximately.

In one embodiment, the heating is conducted by putting the mixture obtained in step 1-i) in an oven.

Thus, after step 1-i) or 1-ii), a clear aqueous aluminate suspension A is obtained.

In one embodiment, the source of aluminum is selected from alumina, hydrated alumina, aluminum powder, $AlCl_3$, $Al_2(SO_4)_3$, aluminum hydroxide $Al(OH)_3$, sodium aluminate and kaolin clays.

Aluminum powder is preferred.

The clear aqueous silicate suspension B of step 1) can be prepared according to the following step:

1-i') mixing a source of silicon, a source of alkali metal M1 and water.

The water is preferably de-ionized or double distilled $H_2O$.

The source of silicon can be selected from any source of silicon that is able to provide during step 1) monomeric or $Si_2$-$Si_6$ oxihydroxide species. Thus, the amount of larger $[SiOOH]_n$ units is limited in the clear aqueous suspension B [R. M. Barrer, "Hydrothermal Chemistry of Zeolites", 1982, Academic press, London].

In one embodiment, the preparation of the clear aqueous silicate suspension B further comprises the following step:

1-ii') heating the mixture obtained in step 1-i').

The heating is preferably performed at a temperature going from 60° C. to 100° C. approximately, during 1 min to 10 min approximately.

In one embodiment, the heating is conducted by putting the mixture obtained in step 1-i') in an oven.

Thus, after step 1-i') or 1-ii'), a clear aqueous silicate suspension B is obtained.

In one embodiment, the source of silicon is selected from silica hydrogel, silicic acid, colloidal silica, fumed silica, tetraalkyl orthosilicates, silica hydroxides, precipitated silica and clays.

Colloidal silica is preferred.

Each of the clear aqueous suspensions A and B contains at least one source of alkali metal M1.

Non-limiting examples of alkali metal M1 sources include hydroxides, oxides, nitrates, sulfates, halides (e.g. fluoride, chloride, bromide, and iodide), oxalates, citrates and acetates of alkali metals M1. Hydroxides of alkali metals M1 are preferred.

In one embodiment, the source of alkali metal M1 is selected from a source of Na, a source of K and a source of Li. A source of Na such as NaOH is preferred.

In one embodiment, the clear aqueous aluminate suspension A and/or the clear aqueous silicate suspension B further comprise a source of alkaline earth metal M2.

Non-limiting examples of alkaline earth metal M2 sources include hydroxides, oxides, nitrates, sulfates, halides (e.g. fluoride, chloride, bromide, and iodide), oxalates, citrates and acetates of alkaline earth metals M2. Hydroxides of alkaline earth metals M2 are preferred.

In one embodiment, the source of alkaline earth metal M2 is selected from a source of Mg and a source of Ca.

Step 2):

In one embodiment, the admixing step 2) is performed at a temperature going from 0° C. to 20° C. approximately, and preferably going from 0° C. to 5° C. approximately. These conditions help to better decrease the polymerization kinetics between silica and alumina based-species and obtain highly uniform amorphous particles (in chemical composition and particle size) in the resulting suspension.

In a preferred embodiment, the clear aqueous aluminate suspension A is added drop wise to the clear aqueous silicate suspension B, said clear aqueous silicate suspension B being kept at a temperature going from 0° C. to 20° C., and more preferably going from 0° to 5° C.

The clear aqueous silicate suspension B can be kept at such temperatures by putting said clear aqueous silicate suspension B in an ice bath.

It is also preferable to have the clear aqueous aluminate suspension A and the clear aqueous silicate suspension B mix under vigorous mechanical stirring or sonication, preferably during about 10 minutes to about 1 h.

Thus, step 2) leads to the homogeneous distribution of reactive silicon-based and aluminum-based species in the resulting suspension.

Step 3):

Thanks to the homogeneous distribution of reactive silicon-based and aluminum-based species in the resulting suspension, the uniform nucleation in the system can be controlled during the aging step 3).

The aging step 3) is accomplished by maintaining the resulting suspension obtained in step 2) at a relatively low temperature, and preferably under conditions which will prevent dehydration of the reaction mixture (such as placing the resulting suspension in a sealed container and/or exposing it to a small amount of water vapor).

In one preferred embodiment, the resulting suspension obtained in step 2) is maintained from about 21° C. to about 27° C. This temperature should be maintained for a time sufficient to favor the nucleation. Thus, during the aging process each particle can generate a nucleus.

In a preferred embodiment, the temperature of the aging step 3) is maintained for at least 12 hours approximately, preferably 20 hours approximately, and more preferably 1 day approximately.

The ageing step 3) is generally performed without any agitation (i.e. without any mechanical stirring or any sonication).

According to one particular embodiment, the aging step 3) is followed by a freeze drying step 3-i) (i.e. lyophilization), and a step 3-ii) in which the water content is adjusted. Indeed, during the freeze drying step 3-i), the water is completely removed from the resulting suspension of previous step 3), and then, during step 3-ii), an amount of water is added in order to obtain a suspension having the same molar composition as the molar composition of the resulting suspension of step 2).

Thanks to steps 2) and 3), uniformity is reached on the size of the amorphous nanoparticles in the resulting suspension.

Step 4):

Step 4) of crystallization is conducted after the aging step 3). During step 4), nuclei formed at the preceding step 3) grow to form single nanocrystals, thus leading to uniform single nanocrystals with a size controllable by the method conditions.

If the crystallization temperature is too high, i.e. above 150° C., or if the crystallization temperature is too low, i.e. below 30° C., crystal transformation can occur in more dense phase such as Sodalite or low crystallinity can be achieved, respectively.

Step 4) is preferably performed at atmospheric pressure until the single nanocrystals of synthetic faujasite material are formed.

The crystallization time required to form single nanocrystals will typically range from about 30 minutes to about 4 days, and more frequently from about 40 min to about 2.5 days.

If the crystallization period is too long, (i.e. above 10 days, at a temperature above 60° C.) or if the crystallization period is too short (i.e. less than 12 h, at a temperature below 60° C.), mixtures of FAU-type zeolite and undesired crystalline material and/or amorphous material are formed such as Sodalite or zeolite A.

Step 4) is preferably performed in the absence of seed crystals added prior to step 4).

At the end of step 4), the single nanocrystals of the synthetic faujasite material are uniformly dispersed in a liquid (also called mother liquor).

Step 4) is generally performed without any agitation (i.e. without any mechanical stirring or any sonication).

It is noted that the formation in the preceding step 3) of amorphous nanoparticles of similar size and identical growth kinetics drastically limits the Ostwald ripening of the nanocrystals, therefore insuring ultimately a much narrower particle size distribution in the nanoparticles of the synthetic faujasite material obtained during step 4).

Step 5):

After step 4), the nanocrystals of the synthetic faujasite material are uniformly dispersed in mother liquor.

Thanks to the method of the present invention, the monodisperse nanoparticles are composed of single nanocrystals and therefore, are non-agglomerated.

The recovering step 5) (i.e. purification and/or washing step) can be performed by filtration, by centrifugation or by dialysis, so as to separate the synthetic faujasite material from the mother liquor. The recovering step 5) can be repeated several times in order to remove all material that is not converted into zeolite.

Additives, such as flocculating agents, can be used in step 5) in order to facilitate the recovering of the synthetic faujasite material.

Examples of flocculating agents are UCARFLOC Polymers such as UCARFLOC polymer 304® which is commercialized by Dow Chemicals.

After step 5), the dry synthetic faujasite material preferably has a silicon to alkali metal M1 molar ratio $Si/M_1$ going from about 1.1 to about 1.5.

In a preferred embodiment, the alkali metal M1 is sodium.

Further Steps:

Once the single nanocrystals of synthetic faujasite material are recovered according to step 5), they may be submitted to the following step 6):

6) drying the single nanocrystals (i.e. the monodisperse nanoparticles) of synthetic faujasite material obtained in step 5).

The drying step is preferably performed at about 25° C. to about 60° C., for example, with air in an oven.

The drying step can also be performed by lyophilization, preferably at a temperature going from about −76° C. to about −92° C. (i.e. freeze-drying step).

The drying step is advantageously conducted at atmospheric or subatmospheric pressures, notably for about 30 minutes to about 12 hours.

The dried single nanocrystals of synthetic faujasite material can be used as synthesized.

According to a preferred embodiment of the invention, the method does not comprise any calcination step after step 5) or after step 6).

Some methods of the prior art include at least one step, which aims at increasing the mesoporosity of a material. This step consists for example of treating a material with phosphoric acid or sodium hydroxide.

However, the synthetic faujasite material of the present invention after step 5) or step 6) already displays the desired mesoporosity, which is due to the close packing of the nanosized faujasite crystals, resulting in inter-particle porosity.

Thus, the method of the present invention preferably does not comprise any step so as to increase the mesoporosity of the synthetic faujasite material obtained in step 5) or in step 6).

In order to preserve the mesoporosity of the synthetic faujasite material, the drying step 6) is preferably performed by lyophilization.

The dried nanocrystals of synthetic faujasite material can be ion exchanged according to a step 7). Typical ion exchange techniques involve contacting the synthetic faujasite material with a solution containing a salt of the desired replacing cation or cations. Thus, the alkali metal cation $M1^+$ is removed and replaced with hydronium, ammonium, or any desired metal cation.

After the ion-exchange step 7), the synthetic faujasite material can be calcined in air or inert gas according to a step 8).

Step 8) can be performed at temperatures ranging from about 380° C. to about 550° C., for periods of time ranging from about 1 to about hours, to produce a synthetic faujasite material comprising monodisperse nanoparticles composed of single nanocrystals in acidic form.

After, this calcination step 8), the synthetic faujasite material can be directly used as a catalyst.

After step 7) and 8), the synthetic faujasite material is in acidic form. This acidic form is required when the material is used as a catalyst in acid-catalyzed reactions such as most of the oil refining and petrochemical reactions.

It is noted that the acidic form is not required when the material is used as a catalyst in base-catalyzed reactions such as side chain alkylation reactions of aromatic hydrocarbons.

A second object of the present invention is a synthetic faujasite material comprising monodisperse nanoparticles composed of single nanocrystals, said nanoparticles having a size going from 5 to 400 nm, preferably from 5 to 200 nm, a silicon to aluminum molar ratio Si/Al going from 1 to 2.5, and a silicon to alkali metal M1 molar ratio Si/M1 going from 1.1 to 1.5.

Said synthetic faujasite material can be prepared according to the method of the first object of the invention.

In another embodiment, said synthetic faujasite material has a specific surface area $S_{BET}$ going from about 500 to 900 $m^2 \cdot g^{-1}$, and preferably from about 700 to 860 $m^2 \cdot g^{-1}$.

The synthetic faujasite material of the present invention can have a total pore volume $V_{total}$ going from about 0.50 to 1.5 $cm^3 \cdot g^{-1}$, and preferably from about 1 to 1.5 $cm^3 \cdot g^{-1}$.

The synthetic faujasite material of the present invention can have an external surface area $S_{ext}$ going from about 40 to 250 $m^2 \cdot g^{-1}$, and preferably from about 150 to 250 $m^2 \cdot g^{-1}$.

A third object of the present invention is a method for the preparation of a stable colloidal suspension of a synthetic faujasite material comprising monodisperse nanoparticles composed of single nanocrystals, said method comprising the following steps:

A) preparing the synthetic faujasite material comprising monodisperse nanoparticles composed of single nanocrystals according to the method of the first object of the present invention; and B) dispersing in a solvent the synthetic faujasite material comprising monodisperse nanoparticles composed of single nanocrystals of step A).

In one embodiment, the solvent is selected from water, acetone, and alcohols such as methanol, ethanol or isopropanol.

Within the meaning of the present invention, the term "stable colloidal suspension" is understood to mean: (a) a suspension without sedimentation of solid particles, (b) no change in particle size distribution in the suspension with time, and (c) a suspension with zeta potential value higher than 1401 mV.

A fourth object of the present invention is the use of the synthetic faujasite material comprising monodisperse nanoparticles composed of single nanocrystals prepared according to the method of the first object of the invention or of the second object of the invention, as a catalyst or adsorbent in gas-solid and liquid-solid reactions (e.g. heterogeneous catalytic reactions), as seed crystals for zeolite synthesis, and for the preparation of membranes or layers (films).

Examples of heterogeneous catalytic reactions are hydrocarbon conversion reactions which include isomerization of $C_5$ and $C_6$ compounds to increase the octane of gasoline, hydrocracking, fluid catalytic cracking, butane alkylation for fuels, aromatics alkylation, aromatics isomerization and olefin polymerization.

A fifth object of the present invention is the use of the stable colloidal suspension of the synthetic faujasite material comprising monodisperse nanoparticles composed of single nanocrystals prepared according to the method of the third object of the invention, as a catalyst or adsorbent in gas-solid and liquid-solid reactions (e.g. heterogeneous catalytic reactions), as seed crystals for zeolite synthesis, and for the preparation of membranes or layers (films).

Indeed, the synthetic faujasite material and the stable colloidal suspension of the present invention can be used for medical, pharmaceutical and cosmetic purposes, environmental drug delivery, medical imaging, and other biomedical applications, as well as for chemical sensing and optical devices.

The synthetic faujasite materials of the present invention can be incorporated in matrices such as $SiO_2$, $Al_2O_3$, or amorphous silica-alumina matrices, so as to be shaped by known techniques such as spray drying, oil-drop, extrusion, pelletizing or tableting.

BRIEF DESCRIPTION OF THE DRAWINGS

FIG. 5 represents high-resolution TEM images of FAU-X-10a;

Figures 11a and 11b are graphs of the associated selectivities at 200° C. (FIG. 11a) and at 225° C. (FIG. 11b) showing the proportions in % of the various products obtained during the TiPBz conversion as a function of the catalyst used in accordance with one embodiment

DETAILED DESCRIPTION

Examples

The starting materials used in the examples which follow, are listed below:
sodium hydroxide: Sigma Aldrich;
colloidal silica (Ludox-HS 30, 30 wt % $SiO_2$, pH=9.8): Aldrich;
aluminum powder (325 mesh, 99.5% purity): Alfa Aesar;
Commercial zeolite Y UOP (LZY-62) with a size of crystals of 0.5 to 3 μm, and a Si/Al molar ratio of 2.5 was used as a reference sample.

These starting materials were used as received from the manufacturers, without additional purification.

The various zeolites obtained in the examples were characterized over various scales of sizes.

Ammonia Exchange and Thermal Treatment:
The synthetic faujasite material obtained after step 6) was ion-exchanged with a solution of 0.2M of $NH_4Cl$ (1 h, 25°

C.). The ion-exchange procedure was repeated 2 times. After the third ion exchange step, the zeolite was washed with dd $H_2O$, and calcined (e.g. at 400° C.) for elimination of the $NH_3$ and obtaining the synthetic faujasite material in acidic form.

Powder X-Ray Diffraction (XRD) Analysis:

Powder samples of the synthetic faujasite material obtained after step 6) were measured using a PANalytical X'Pert Pro diffractometer with CuKα monochromatized radiation (λ=1.5418 Å). The samples were scanned in the range 4-50° 2θ with a step size of 0.020.

Dynamic Light Scattering (DLS) Analysis:

The hydrodynamic diameters of the synthetic faujasite material in the various suspensions were determined with a Malvern Zetasizer Nano. The analyses were performed on samples after purification with a solid concentration of 10 wt % and pH=8. The back scattering geometry (scattering angle 173°, HeNe laser with 3 mW output power at 632.8 nm wavelength) allows measurements at high sample concentration, since a complete penetration of the incident light through the sample is not required.

Transmission Electron Microscopy (TEM):

Diluted colloidal suspensions of synthetic faujasite material obtained after step 5) were sonicated for 15 min and then 2-3 drops of fine particle suspensions were dried on carbon-film-covered 300-mesh copper electron microscope grids. The crystal size, morphology and crystallinity of solids were determined by a transmission electron microscopy (TEM) using a JEOL 2010 FEG operating at 200 kV.

Scanning Electron Microscopy (SEM):

The surface features, morphology and size of zeolite nanocrystals were determined by field-emission scanning electron microscope (SEM, Philips XL30 FEG) with an accelerating voltage 10-30 kV. All samples prior the SEM characterization were covered with a conductive layer (Pt or Au).

$N_2$ Sorption Analysis:

Nitrogen adsorption/desorption isotherms were measured using Micrometrics ASAP 2020 volumetric adsorption analyzer. Samples of the synthetic faujasite material obtained after step 6) were degassed at 523 K under vacuum overnight prior to the measurement. The external surface area and micropore volume were estimated by alpha-plot method using Silica-1000 (22.1 $m^2 \cdot g^{-1}$ assumed) as a reference. The micropore and mesopore size distributions of solids were estimated by Nonlocal Density Functional Theory (NLDFT) and Barret-Joyner-Halenda (BJH) methods, respectively.

Thermal (TG/DTG) Analyses:

The analyses were performed on samples of the synthetic faujasite material obtained after step 6 using a Setaram TGDSC 111 analyzer (heating rate of 5° $C. \cdot min^{1'}$) under an air flow of 40 $ml \cdot min^{-1}$.

Chemical Analysis:

The chemical compositions of the synthetic faujasite materials obtained after step 6) were determined by inductively coupled plasma (ICP) optical emission spectroscopy using a Varian ICP-OES 720-ES.

Example 1

Preparation of a Synthetic Faujasite Material FAU-Y-10a According to the Method of the Invention Step 1):

A clear aqueous aluminate suspension A was prepared by dissolving 2.5 g of NaOH in 4.4 g of dd $H_2O$, followed by slow addition of 0.243 g of aluminum powder.

A clear aqueous silicate suspension B was prepared by mixing 10 g of colloidal silica with 1.1 g of NaOH, and 3 g of dd $H_2O$. As a result, a turbid suspension was obtained. In order to transform the turbid into clear suspension, the turbid suspension was placed in an oven at 100° C. for 6 minutes.

Step 2):

Solution A was added drop wise under vigorously stirring to the solution B; during the mixing, solution B was kept in ice.

The resulting clear suspension had the following molar composition: $9Na_2O:0.9Al_2O_3:10SiO_2:160H_2O$.

Step 3):

The resulting clear suspension was then aged 24 h at room temperature (i.e. 25° C.).

Step 4):

Then, the hydrothermal crystallization was conducted at 50° C. for 2 days to obtain monodisperse nanoparticles of synthetic faujasite material FAU-Y-10a dispersed in mother liquor, said nanoparticles having a size of 10 nm.

Steps 5) and 6):

Single nanocrystals of synthetic faujasite material FAU-Y-10a with a Si/Al molar ratio=1.6 were purified by repeating steps of centrifugation (25.000 rpm for 4 h) and redispersion in distilled water until reaching pH=7, and then freeze-dried prior further characterization.

The yield was 80%.

The Si concentration was 99.27 mg/l, the Al concentration was 61.43 mg/l, and the Na concentration was 48.44 mg/l.

Example 2

Preparation of Synthetic Faujasite Materials FAU-Y-10b. FAU-Y-10c and FAU-Y-10d with Different Si/Al Molar Ratios According to the Method of the Invention 3 synthetic faujasite materials FAU-Y-10 with different Si/Al molar ratios, were prepared according to the method described in example 1, except that step 2) the resulting clear aqueous suspensions had the following molar compositions:

$8Na_2O:0.8Al_2O_3:10SiO_2:160H_2O(FAU\text{-}Y\text{-}10b)$, $8Na_2O:0.7Al_2O_3:10SiO_2:160H_2O(FAU\text{-}Y\text{-}10c,d)$, and step 4) was performed in other conditions.

The conditions used in step 4) for each of the synthetic faujasite materials FAU-Y-10, their respective Si/Al molar ratio, and their respective Si, Al and Na concentrations (conc.) are given in Table 1 below:

TABLE 1

| synthetic faujasite material | Conditions of step 4) | Si/Al molar ratio | Conc. of Si (mg/l) | Conc. of Al (mg/l) | Conc. of Na (mg/l) |
|---|---|---|---|---|---|
| FAU-Y-10b | 80° C., 8 h | 1.62 | 99.27 | 61.43 | 48.44 |
| FAU-Y-10c | 100° C., 2 h | 1.73 | 98.49 | 57.12 | 60.39 |
| FAU-Y-10d | 120° C., 1 h 10 | 1.84 | 112.33 | 61.05 | 57.23 |

The yield was 80% for FAU-Y-10b, 78% for FAU-Y-10c, and 75% for FAU-Y-10d.

Example 3

Preparation of a Synthetic Faujasite Material FAU-Y-70a According to the Method of the Invention Step 1):

A clear aqueous aluminate suspension A was prepared by dissolving 2.4 g of NaOH in 6 g of dd $H_2O$, followed by slow addition of 0.189 g of aluminum powder.

A clear aqueous silicate suspension B was prepared by mixing 10 g of colloidal silica with 1.2 g of NaOH, and 5 g of dd $H_2O$. As a result, a turbid suspension was obtained. In order to transform the turbid into clear suspension, the turbid suspension was placed in an oven at 100° C. for 6 minutes.

Step 2):

Solution A was added drop wise under vigorously stirring to the solution B; during the mixing, solution B was kept in ice.

The resulting turbid suspension had the following molar composition: $9Na_2O:0.7Al_2O_3:10SiO_2:200H_2O$.

Step 3):

The resulting turbid suspension was then aged 24 h at room temperature (i.e. 25° C.).

Step 4):

Then, the hydrothermal crystallization was conducted at 150° C. for 45 minutes to obtain monodisperse nanoparticles of a synthetic faujasite material FAU-Y-70a dispersed in mother liquor, said nanoparticles having a particle size of 70 nm.

Steps 5) and 6):

Single nanocrystals of a synthetic faujasite material FAU-Y-70a with a Si/Al molar ratio=1.65 were purified by three steps centrifugation (25.000 rpm for 4 h) followed by redispersion in water until reached pH=7, and then freeze-dried prior further characterization.

The yield was 80%.

The Si concentration was 107.45 mg/l, the Al concentration was 65.12 mg/ml, and the Na concentration was 55.94 mg/l.

Example 4

Preparation of Synthetic Faujasite Materials FAU-Y-70b and FAU-Y-70c with Different Si/Al Molar Ratios According to the Method of the Invention 2 synthetic faujasite materials FAU-Y-70 with different Si/Al molar ratio, were prepared according to the method described in example 3, except that step 4) was performed in other conditions.

The conditions used in step 4) for each of the synthetic faujasite materials FAU-Y-70, their respective Si/Al molar ratio and their respective Si, Al and Na concentrations (conc.) are given in Table 2 below:

TABLE 2

| synthetic faujasite material | Conditions of step 4) | Si/Al molar ratio | Conc. of Si (mg/l) | Conc. of Al (mg/l) | Conc. of Na (mg/l) |
|---|---|---|---|---|---|
| FAU-Y-70b | 100° C., 4 h 30 | 1.75 | 110.95 | 63.40 | 50.94 |
| FAU-Y-70c | 120° C., 1 h 10 | 1.9 | 123.52 | 65.01 | 59.40 |

The yield was 85% for FAU-Y-70b and 82% for FAU-Y-70c.

Example 5

Preparation of a Synthetic Faujasite Material FAU-X-10a According to the Method of the Invention Step 1):

A clear aqueous aluminate suspension A was prepared by dissolving 2.5 g of NaOH in 3 g of dd $H_2O$, followed by slow addition of 0.297 g of aluminum powder.

A clear aqueous silicate suspension B was prepared by mixing 10 g of colloidal silica with 1.1 g of NaOH, and 1 g of dd $H_2O$. As a result, a turbid suspension was obtained. In order to transform the turbid into clear suspension, the turbid suspension was placed in an oven at 100° C. for 6 minutes.

Step 2):

Solution A was added drop wise under vigorously stirring to the solution B; during the mixing, solution B was kept in ice.

The resulting clear suspension had the following molar composition: $9Na_2O:1.1Al_2O_3:10SiO_2:25H_2O$.

Step 3):

The resulting clear suspension was then aged 24 h at room temperature (i.e. 25° C.), freeze dried, and the water content was adjusted.

Step 4):

Then, the hydrothermal crystallization was conducted at 50° C. for 2 days to obtain monodisperse nanoparticles of a synthetic faujasite material FAU-X-10a dispersed in mother liquor, said nanoparticles having a particle size of 10 nm.

Steps 5) and 6):

Single nanocrystals of the synthetic faujasite material FAU-X-10a were purified by three steps centrifugation (25.000 rpm for 4 h) followed by redispersion in water until reached pH=7, and then freeze-dried prior further characterization.

The yield was 78%.

The Si/Al molar ratio of the obtained synthetic faujasite material FAU-X-10 was 1.14, with a Si concentration of 78.84 mg/l, an Al concentration of 69.13 mg/ml, and a Na concentration of 62.23 mg/l.

Example 6

Preparation of Synthetic Faujasite Materials FAU-X-10b, FAU-X-10c and FAU-X-10d with Different Si/Al Molar Ratios According to the Method of the Invention 3 synthetic faujasite materials FAU-X-10 with different Si/Al molar ratios, were prepared according to the method described in example 5, except that step 4) was performed in other conditions.

The conditions used in step 4) for each of the synthetic faujasite materials FAU-X-10, their respective Si/Al molar ratio and their respective Si, Al and Na concentrations (conc.) are given in Table 3 below:

TABLE 3

| synthetic faujasite material | Conditions of step 4) | Si/Al molar ratio | Conc. of Si (mg/l) | Conc. of Al (mg/l) | Conc. of Na (mg/l) |
|---|---|---|---|---|---|
| FAU-X-10b | 80° C., 10 h | 1.10 | 75.64 | 68.76 | 63.87 |
| FAU-X-10c | 100° C., 3 h | 1.17 | 81.33 | 69.12 | 58.75 |
| FAU-X-10d | 120° C., 1 h 30 | 1.22 | 85.83 | 70.35 | 59.32 |

The yield was 80% for FAU-X-10b, 78% for FAU-X-10c, and 85% for FAU-X-10d.

Thus, the crystal engineering strategy developed in this invention leads to extremely small FAU-type nanocrystals with exceptional crystalline yield.

Example 7

Figure 1:
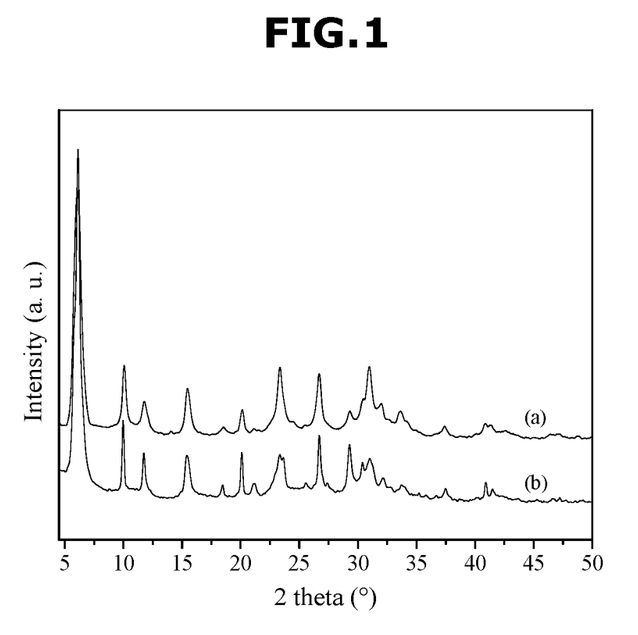
FIG. 1 represents the XRD diffraction spectrum of the synthetic faujasite material FAU-Y-10a prepared according to example 1.

Characterization of the Synthetic Faujasite Materials Prepared According to the Method of the Invention 7.1 Powder X-Ray Diffraction (XRD) Analysis FIG. 1 represents the XRD diffraction spectrum of the synthetic faujasite material FAU-Y-10a prepared according to example 1 (FIG. 1a) and the synthetic faujasite material FAU-Y-70a prepared according to example 3 (FIG. 1b). FIG. 1 shows the intensity (in arbitrary units: a.u.) as a function of the angle 2θ (in degree). Crystallites with sizes of 10 nm exhibit broadened but intensive Bragg peaks. Sharper Bragg peaks are present on the FAU-Y-70 sample (FIG. 1b).

Figure 2:
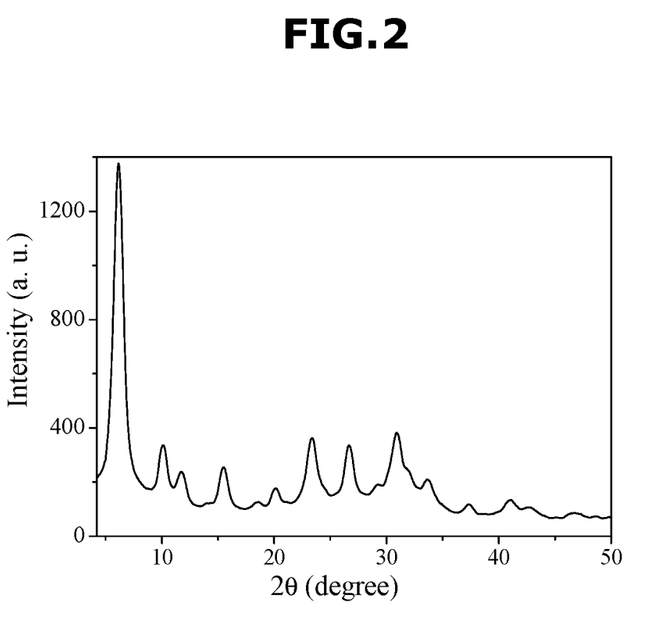
FIG. 2 represents the XRD diffraction spectrum of the synthetic faujasite material FAU-X-10a prepared according to example 5.

FIG. 2 represents the XRD diffraction spectrum of the synthetic faujasite material FAU-X-10a prepared according to example 5. FIG. 2 shows the intensity (in arbitrary units: a.u.) as a function of the angle 2θ (in degree). Crystallites with sizes of 10 nm exhibit broadened Bragg peaks.

7.2 Dynamic Light Scattering (DLS) Analysis

Figure 3:
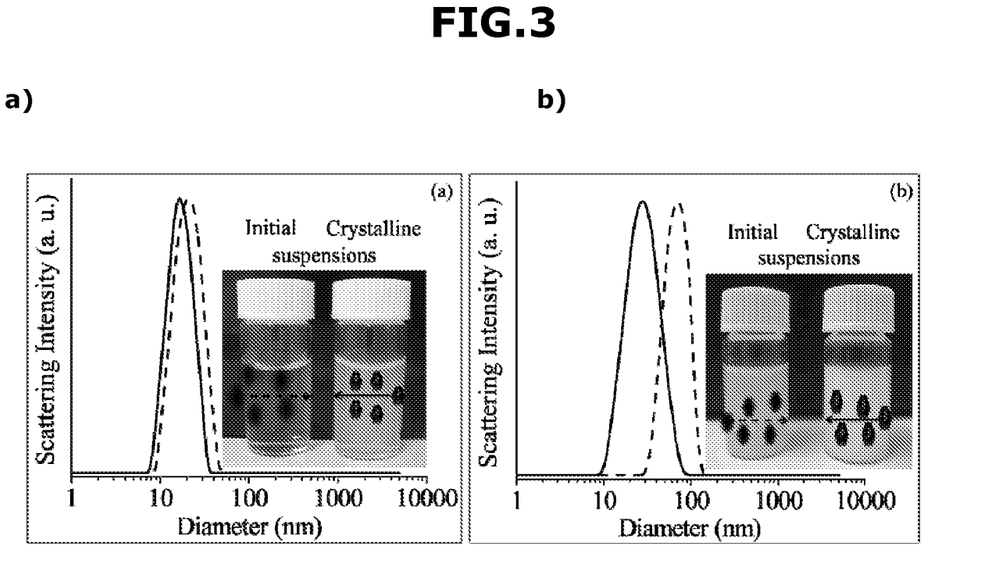
FIGS. 3a and 3b represent the DLS curves of the suspension prior to and after the crystallization step 4), for the synthetic faujasite materials FAU-Y-10a (FIG. 3a) and FAU-Y-70a (FIG. 3b)

FIG. 3 represents the DLS curves of the suspension prior to the crystallization step 4) (FIGS. 3a and 3b, curves with plain lines) and after the crystallization step 4) (FIGS. 3a and 3b, curves with dotted lines) for the synthetic faujasite materials FAU-Y-10a (FIG. 3a) and FAU-Y-70a (FIG. 3b). FIG. 3 shows the scattering intensity (in arbitrary units: a.u.) as a function of the diameter of the obtained nanoparticles (in nm).

For the synthetic faujasite material FAU-Y-10a, the resulting suspension obtained in step 2) or step 3) is clear (FIG. 3a, left picture) and evolves to a milky suspension after a 40 h hydrothermal crystallization 4) at 50° C. (FIG. 3a, right picture). The average hydrodynamic diameter of the amorphous and crystalline particles changes from 12 nm to 20 nm, which corresponds to the transformation from clear suspension to a crystalline milky suspension (polydispersity index of 0.01). This is consistent with the particle size distribution measurements indicating that both amorphous and crystalline suspensions contain narrowly distributed particles.

The DLS curves of the synthetic faujasite material FAU-Y-70a show a substantial difference between the size of the particles in the resulting suspension obtained in step 2) or step 3) (~20 nm) (FIG. 3b, left picture) and the size of the particles in the milky suspension after the hydrothermal crystallization 4) (~70 nm) (FIG. 3b, right picture).

The growth of the synthetic faujasite material FAU-Y-10a is very limited by the low temperature and crystallization is done mainly by propagation through the gel network. With the synthetic faujasite material FAU-Y-70a, the higher temperature (150° C.) during crystal growth favors the Ostwald ripening and thus larger particles grow at the expense of smaller ones.

The crystalline suspensions after step 4) of the synthetic faujasite materials FAU-Y-10a and FAU-Y-70a are stable, as such, for 6 months without any noticeable change.

7.3 Transmission Electron Microscopy (TEM)

Figure 4:
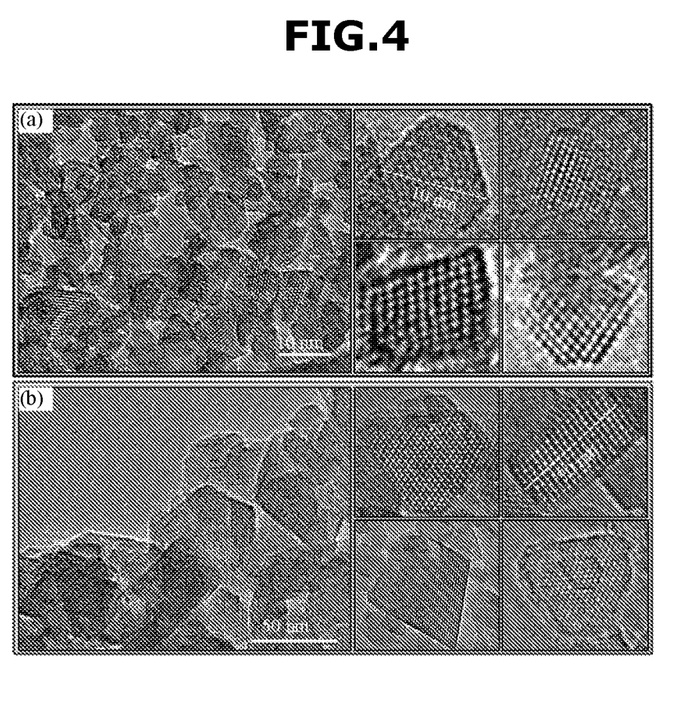
FIGS. 4a and 4b represents high resolution transmission electron microscopy (HR-TEM) images of FAU-Y-10a (FIG. 4a) and FAU-Y-70a (FIG. 4b)

FIG. 4 represents high resolution transmission electron microscopy (HR-TEM) images of FAU-Y-10a (FIG. 4a) and FAU-Y-70a (FIG. 4b). The HR-TEM indicates that the zeolite particles are single crystals of about 10 nm (FAU-Y-10a) and 70 nm (FAU-Y-70a) and the reticular distances between lattice fringes are those expected for FAU-type zeolites. No intergrowths with different lattice orientations are observed, which is a strong indication that each crystal originates from a single nucleus in one isolated amorphous particle. The process of crystal growth is completed since even the smallest crystals (FAU-Y-10a) are well shaped with the typical octahedral morphology observed in natural faujasite.

Figure 5:
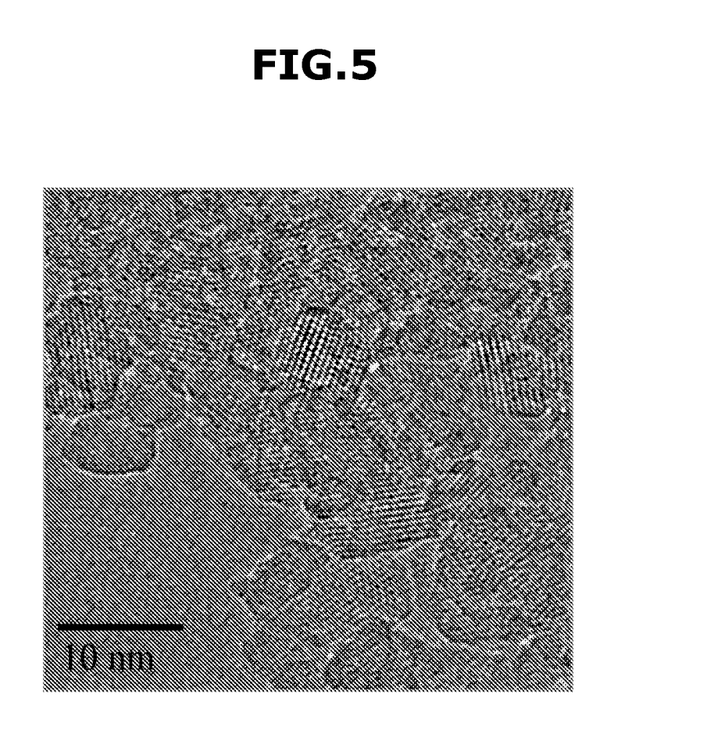

FIG. 5 represents high-resolution TEM images of FAU-X-10a. The HR-TEM indicates that the nanoparticles are composed of single nanocrystals with size of about 10 nm (FAU-X-10a).

The crystal sizes calculated using the Scherrer equation (XRD analysis) are in good agreement with dynamic light scattering (DLS) measurements as well as with HRTEM results.

7.4 Scanning Electron Microscopy (SEM)

Figure 6:
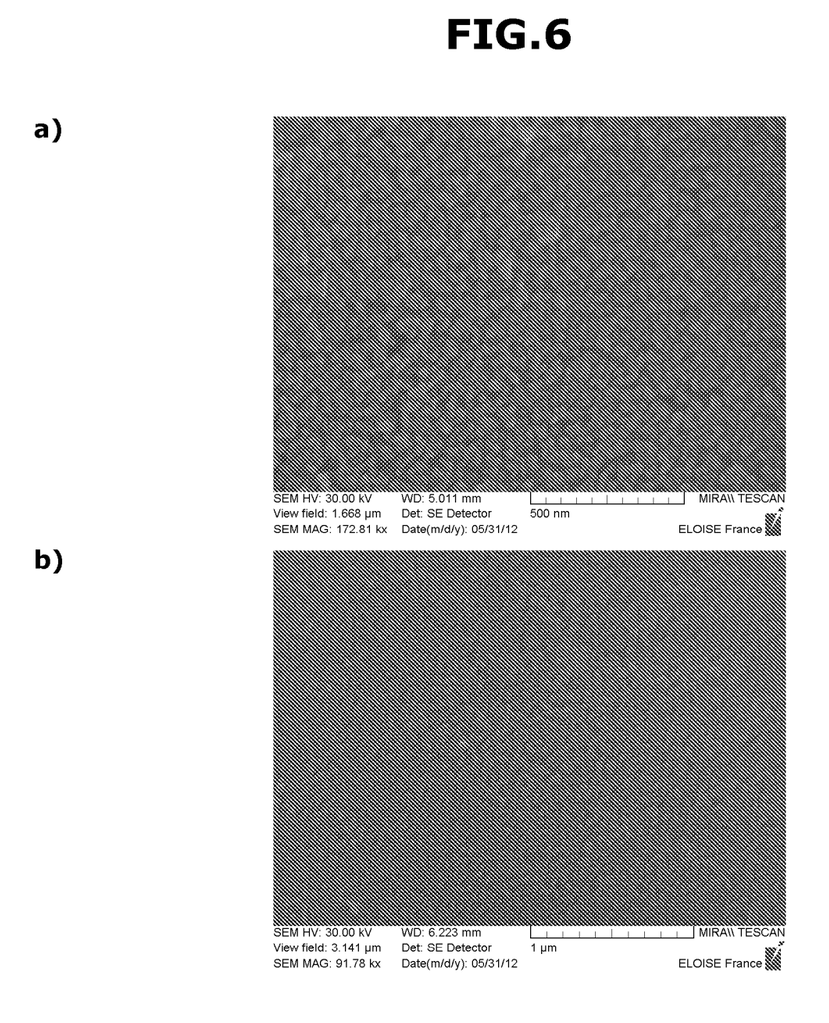
FIGS. 6a and 6b represents scanning electron microscopy (SEM) images of FAU-Y-10a (FIG. 6a: 500 nm scale and FIG. 6b: 1 μm scale)

FIG. 6 represents scanning electron microscopy (SEM) images of FAU-Y-10a (FIG. 6a: 500 nm scale and FIG. 6b: 1 μm scale). FIG. 6 shows no aggregates of nanocrystals or no polycrystalline agglomerates.

7.5 Nitrogen Adsorotion/Desorotion Measurements 7.5.1 Nitrogen Sorption Data

The results of the $N_2$ sorption measurements carried out on each of the zeolites synthesized examples 1, 3 and 5 are collated in table 4 below. Thus, the total volume ($V_{total}$), the mesopore diameter ($d_{meso}$), the mesopore volume ($V_{meso}$), the external surface area ($S_{ext}$), the micropore volume ($V_{micro}$), and the specific surface area ($S_{BET}$) for each zeolite prepared according to the invention and for a commercial reference are reported below in Table 4.

TABLE 4

| Zeolite | $V_{total}$ (cm$^3 \cdot$g$^{-1}$) | $d_{meso}{}^a$ (nm) | $V_{meso}$ (cm$^3 \cdot$g$^{-1}$) | $S_{ext}$ (m$^2 \cdot$g$^{-1}$) | $V_{micro}$ (cm$^3 \cdot$g$^{-1}$) | $S_{BET}$ (m$^2 \cdot$g$^{-1}$) |
|---|---|---|---|---|---|---|
| FAU-Y-10a | 1.27 | 30 | 0.97 | 223 | 0.30 | 842 |
| FAU-Y-70a | 0.64 | 80 | 0.32 | 59 | 0.32 | 856 |
| FAU-X-10a | 1.26 | 25 | 0.98 | 175 | 0.28 | 820 |
| UOP LZY-62 | 0.37 | No | 0.06 | 26 | 0.31 | 810 |

$^a$Determined by BJH method 7.5.2 Nitrogen Adsorption/Desorption Isotherms

Figure 7:
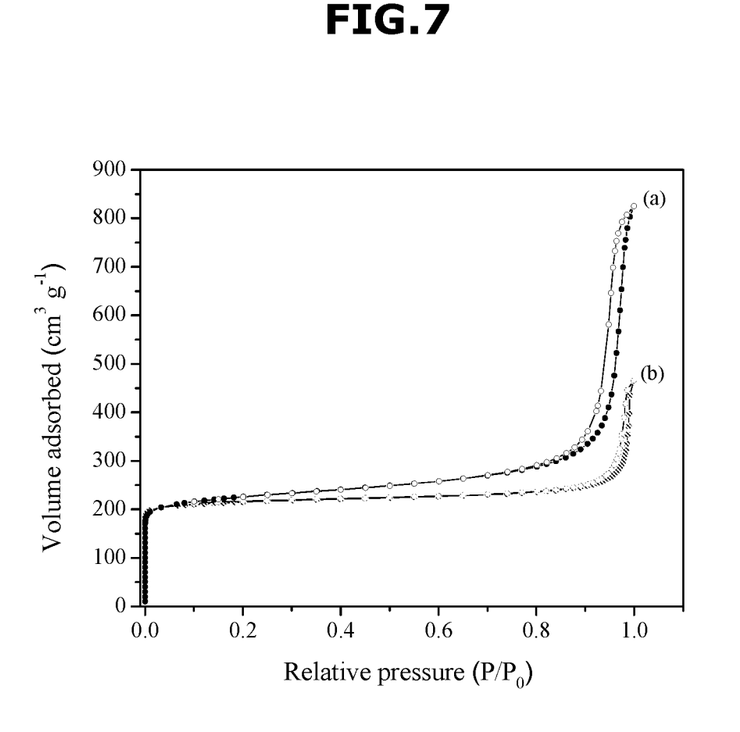
FIGS. 7a, 7b and 8 represent nitrogen adsorption/desorption isotherms of FAU-Y-10a (FIG. 7a), FAU-Y-70a (FIG. 7b) and FAU-X-10a (FIG. 8)
Figure 8:
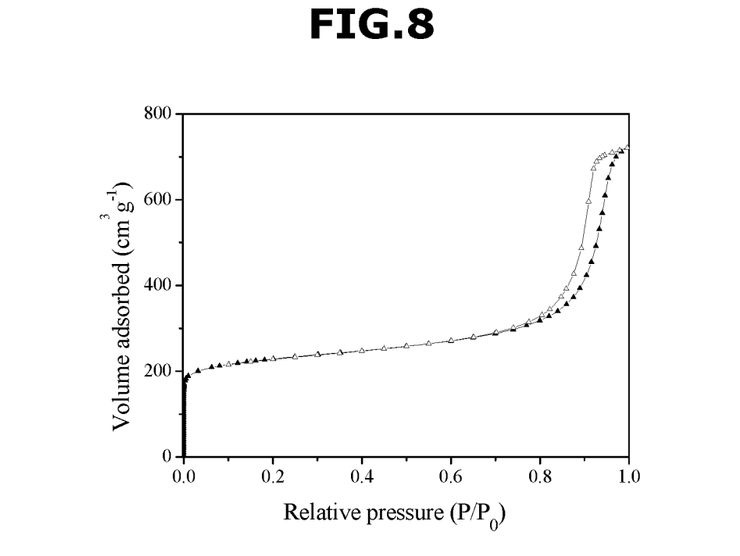

FIGS. 7 and 8 represent nitrogen adsorption/desorption isotherms of FAU-Y-10a (FIG. 7a), FAU-Y-70a (FIG. 7b) and FAU-X-10a (FIG. 8). FIGS. 7 and 8 show the volume adsorbed in cm$^3 \cdot$g$^{-1}$ as a function of the relative pressure $P/P_0$.

Nitrogen adsorption characterizes the porosity and specific surface area of the two zeolites. According to FIGS. 7 and 8, it can be concluded that all zeolites exhibit type I sorption isotherms. As can be seen, the intense uptake at low relative pressure is combined with a large hysteresis loop at high relative pressure. Such a feature is clearly related with textural pores formed by the closed packing of monodispersed and well-shaped nanocrystals. The unusually high mesoporosity is attributed to the packing of FAU-Y-10a and FAU-Y-70a crystals delineating regular mesopores with a diameter of 40 nm and 80 nm, respectively.

Their Brunauer-Emmett-Teller (BET) surface area is 842, 856 and 820 $m^2 \cdot g^{-1}$ while their total pore volume is 1.27, 0.64 and 1.26 $cm^3 \cdot g^{-1}$, respectively (Table 4). The extremely high micropore volume of 0.30 $m^3 \cdot g^{-1}$ is noteworthy for the extremely small (10 nm) nanocrystals, as it corresponds to the theoretical value for highly crystalline FAU-type zeolite. These results underline the high crystallinity of the materials. In particular, this is not observed for ultrasmall FAU crystals synthesized in the prior art in the presence of an organic structure-directing agent. Another important feature of FAU-Y-10a is its high external surface area of 223 $m^2 \cdot g^{-1}$, opening opportunities for processes taking place on the crystal surface. The corresponding values for FAU-Y-70a and FAU-X-10a are 59 and 175 $m^2 \cdot g^{-1}$.

7.6 Stability of the Synthetic Faujasite Materials Prepared According to the Method of the Invention 7.6.1 Powder X-Ray Diffraction (XRD) Analysis The stability of FAU-Y-10a and FAU-Y-70a samples after a thermal treatment at 550° C. for 4 h with or without a preliminary ion exchange with ammonia was studied by XRD. The XRD patterns of FAU-Y-10a and FAU-Y-70a did not change under these treatments; in particular, both positions and intensities of all Bragg peaks were preserved (data not shown).

7.6.2 Thermal (TG/DTG) Analyses

Figure 9:
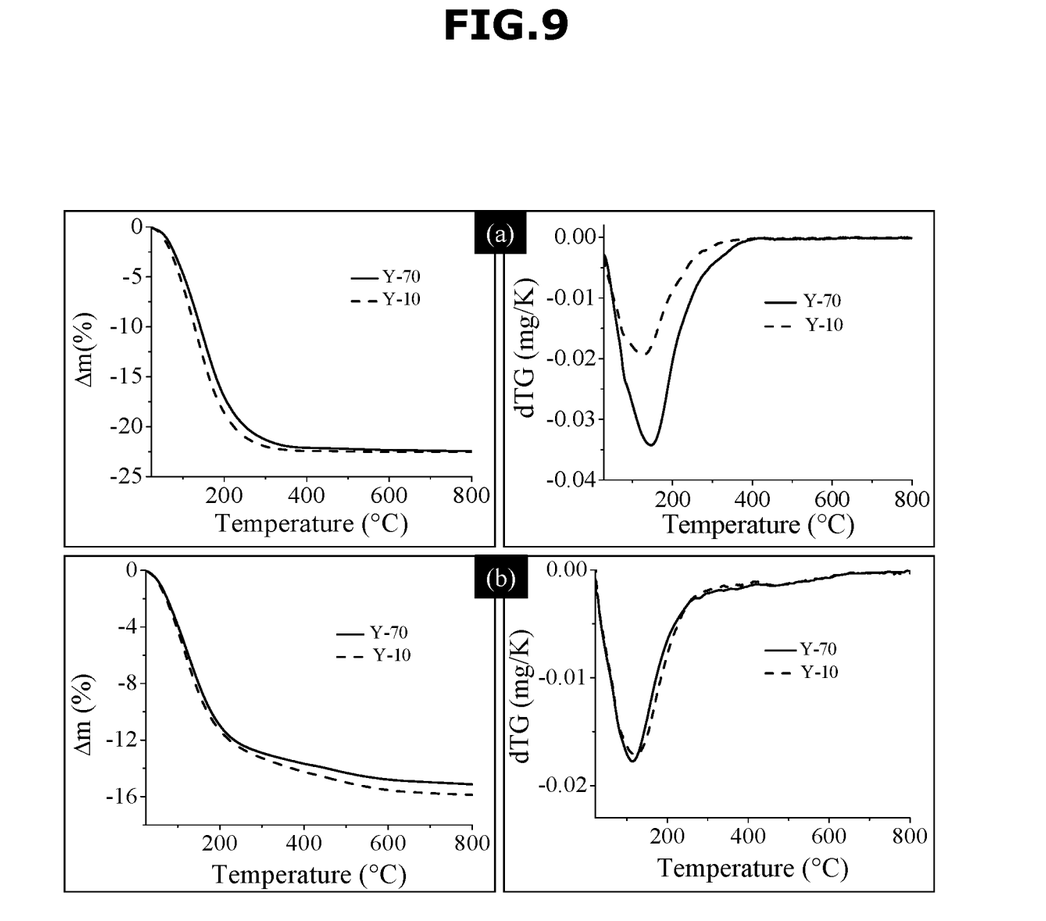
FIG. 9 represents TG/DTG data of FAU-Y-10a (curves with dotted lines) and FAU-Y-70 (curves with plain lines) obtained after step 6) and a calcination step at 550° C. under air (FIG. 9a), and obtained after ion exchange with ammonia (step 7) and a calcination step at 400° C. under air (step 8) (FIG. 9b).

FIG. 9 represents TG/DTG data of FAU-Y-10a (curves with dotted lines) and FAU-Y-70 (curves with plain lines) obtained after step 6) and a calcination step at 550° C. under air (FIG. 9a), and obtained after ion exchange with ammonia (step 7) and a calcination step at 400° C. under air (step 8) (FIG. 9b). More particularly, FIG. 8 shows on the left the Δm in % as a function of temperature in ° C., and on the right the differential thermogravimetric (DTG) in mg/min as a function of temperature in ° C.

Thus, TG/DTG data on thermally treated samples confirmed the high stability of the zeolites prepared by the method of the invention. In addition, thermogravimetry indicated that all synthetic faujasite materials retain their water capacity after such a thermal treatment. The water desorbed from FAU-Y-10a and FAU-Y-70a amount to approximately 23 wt %.

The Zeta potential for both suspensions of FAU-Y-10a and FAU-Y-70a was found to be of −55 mV, explaining their colloidal stability (data not shown).

Example 8

Catalytic Activity of the Synthetic Faujasite Material Prepared According to the Method of the Invention A catalytic test was performed to evaluate the external surface properties of the zeolites prepared according to the method of the invention.

The synthetic faujasite materials prepared in examples 1 and 3 were ion-exchanged with ammonia (step 7) and heat treated at 400° C. to eliminate $NH_3$ (step 8) and obtain the synthetic faujasite materials in acidic form.

Figure 10:
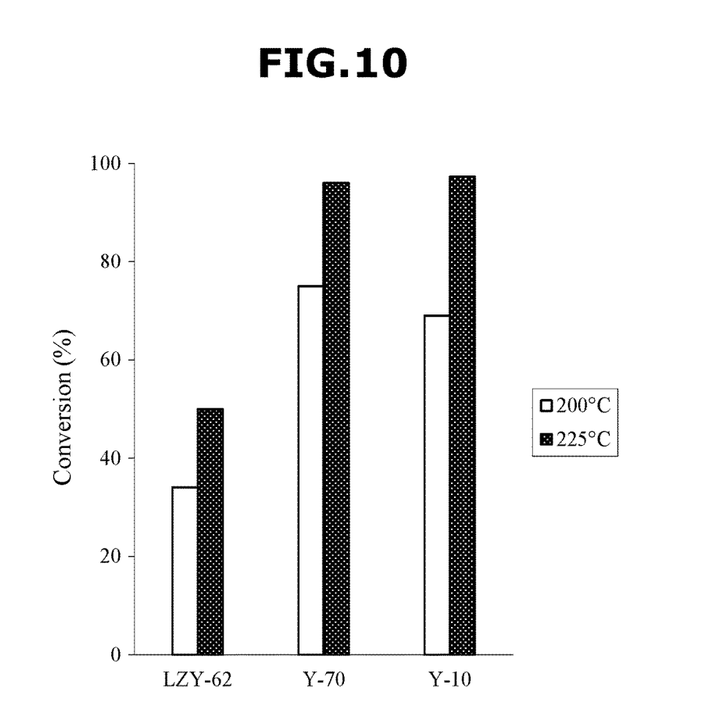
FIG. 10 is a graph of the TiPBz conversion in % as a function of the catalyst used, in accordance with one embodiment.
Figure 11:
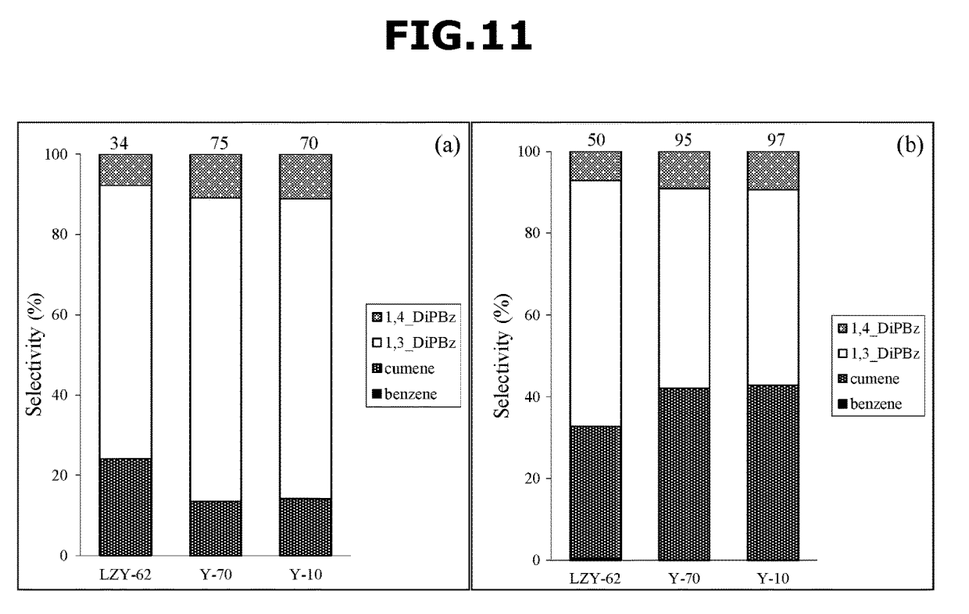

Thus, the conversion of a bulky molecule such as 1,3,5-triisopropylbenzene (TiPBz, kinetic diameter of 0.95 nm, well above the 0.73 nm pore opening of the FAU structure) in the presence of the corresponding catalysts FAU-Y-10a or FAU-Y-70a or a commercial zeolite LZY-62 (UOP) was studied. TiPBz is commonly used to study the external surface properties of large pore zeolites. The tests were performed under identical conditions ($P_{Tot}=1.01 \cdot 10^5$ Pa, $P_{TiPBz}=180$ Pa, $W/F°_{TiPBz}=82$ kg·s·mol$^{-1}$) in a downflow fixed bed gas phase reactor at two temperatures: 200° C. and 225° C. FIG. 10 shows the TiPBz conversion in % as a function of the catalyst used. FIG. 11 reports the associated selectivities at 200° C. (FIG. 11a) and at 225° C. (FIG. 11b) by showing the proportions in % of the various products obtained during the TiPBz conversion as a function of the catalyst used. Said products can be cumene, 1,3-diisopropylbenzol (1,3-DiPBz) and 1,4-diisopropylbenzol (1,4-DiPBz).

They show that nanosized catalysts FAU-Y-70a and FAU-Y-10a are more active than a good quality commercial zeolite such as LZY-62 (UOP). In addition, there is a clear trend between particle size and activity at both temperatures. The FAU-Y-10a and the FAU-Y-70a catalysts display similar performances although their external surface areas are quite different and their bulk Si/Al ratios are very close.

The selectivity data (FIG. 11) provide further insight, especially at 200° C. While conversion steadily increases from the LZY-62 to the FAU-Y-70a/FAU-Y-10a catalysts, the latter remain very selective towards the mono-dealkylated products, further indicating that the external surface is the main locus of the reaction.

The above results highlight that the synthetic faujasite materials prepared according to the method of the invention display the qualities required to have a strong impact in potential applications. In particular, they display desirable physico-chemical properties while their large scale production could meet strict health, safety and environmental requirements at an affordable cost.

These FAU nanocrystals reach the theoretical maximum porosity and stay stable as colloidal suspension and as powders. The properties of the nanocrystalline FAU zeolite for adsorption and intracrystalline diffusion afford many potential opportunities for applications in environmental catalysis, environmental remediation, decontamination, and drug delivery. The possible green mass production of nano-sized FAU-type zeolite provides excellent opportunities for applications in catalysis, adsorption and separations involving larger molecules. Besides, design of nanoscale devices including optical layers, de-humidifiers, thin films, membranes will be possible by using ultra small nanocrystals with a size smaller than 10 nm via pattering techniques.

The invention claimed is:

1. A method for the preparation of a synthetic faujasite material having monodisperse nanoparticles composed of single nanocrystals, said nanoparticles having a size going from 5 to 400 nm and a silicon to aluminum molar ratio Si/Al going from 1 to 2.5, wherein said method comprises the following steps:

A) separately preparing a clear aqueous aluminate suspension A comprising at least one source of aluminum and at least one source of an alkali metal M1, and a clear aqueous silicate suspension B comprising at least one source of silicon and at least one source of an alkali metal M1, said separate preparations being prepared at 20-25° C.;

B) admixing the clear aqueous aluminate suspension A and the clear aqueous silicate suspension B until a resulting aqueous suspension is obtained, said resulting aqueous suspension being free of organic-templating agents and having the following molar composition:

$$x_1M1_2O{:}yAl_2O_3{:}10SiO_2{:}zH_2O \qquad (I)$$

in which:
0.1≤y≤5,
20≤z≤400, and preferably 20≤z≤320,
5≤x₁≤13;
wherein in step B), the clear aqueous silicate suspension B only is cooled to a temperature of 0° to 5° C., then the clear aqueous aluminate suspension A is added drop wise to the cooled clear aqueous silicate suspension B, while said clear aqueous silicate suspension B is kept at a temperature going from 0° to 5° C. for the duration of the dropwise addition,
C) aging the resulting suspension of step 2) at a temperature going from about 20° C. to about 30° C. to form nuclei;
D) heating the resulting suspension of step 3) at a temperature going from about 40° C. to about 150° C., for a period of time sufficient to produce the desired synthetic faujasite material comprising monodisperse nanoparticles composed of single nanocrystals; and
E) recovering said synthetic faujasite material comprising monodisperse nanoparticles composed of single nanocrystals.

2. The method according to claim 1, wherein the source of aluminum is aluminum powder.

3. The method according to claim 1, wherein the source of silicon is colloidal silica.

4. The method according to claim 1, wherein the source of alkali metal M1 is selected from a source of Na, a source of K and a source of Li.

5. The method according to claim 1, wherein in step B), the clear aqueous aluminate suspension A and the clear aqueous silicate suspension B are mixed under vigorous mechanical stirring or sonication.

6. The method according to claim 1, wherein the temperature of step C) is maintained for at least 12 hours.

7. The method according to claim 1, wherein step E) is performed by filtration, centrifugation or dialysis.

8. The method according to claim 1, wherein it further comprises the following step:
F) drying the single nanocrystals of synthetic faujasite material obtained in step E).

9. A method for the preparation of a stable colloidal suspension of a synthetic faujasite material having monodisperse nanoparticles composed of single nanocrystals, said method comprising the following steps:
A) preparing a synthetic faujasite material comprising monodisperse nanoparticles composed of single nanocrystals according to the method as defined in claim 1; and
B) dispersing in a solvent the synthetic faujasite material comprising monodisperse nanoparticles composed of single nanocrystals of step A).

10. The method according to claim 9, wherein the solvent is selected from water, acetone and alcohols.

* * * * *